3,562,127
TREATMENT OF EXHAUST GASES CONTAINING NITROGEN OXIDES AND OTHER NOXIOUS COMPOUNDS
Thomas C. Wooton, El Monte, and William F. Mangold, West Covina, Calif., assignors to Scientific Industries of California, El Monte, Calif., a corporation of California
Filed May 28, 1969, Ser. No. 828,649
Int. Cl. B03c *3/00*
U.S. Cl. 204—164                                                4 Claims

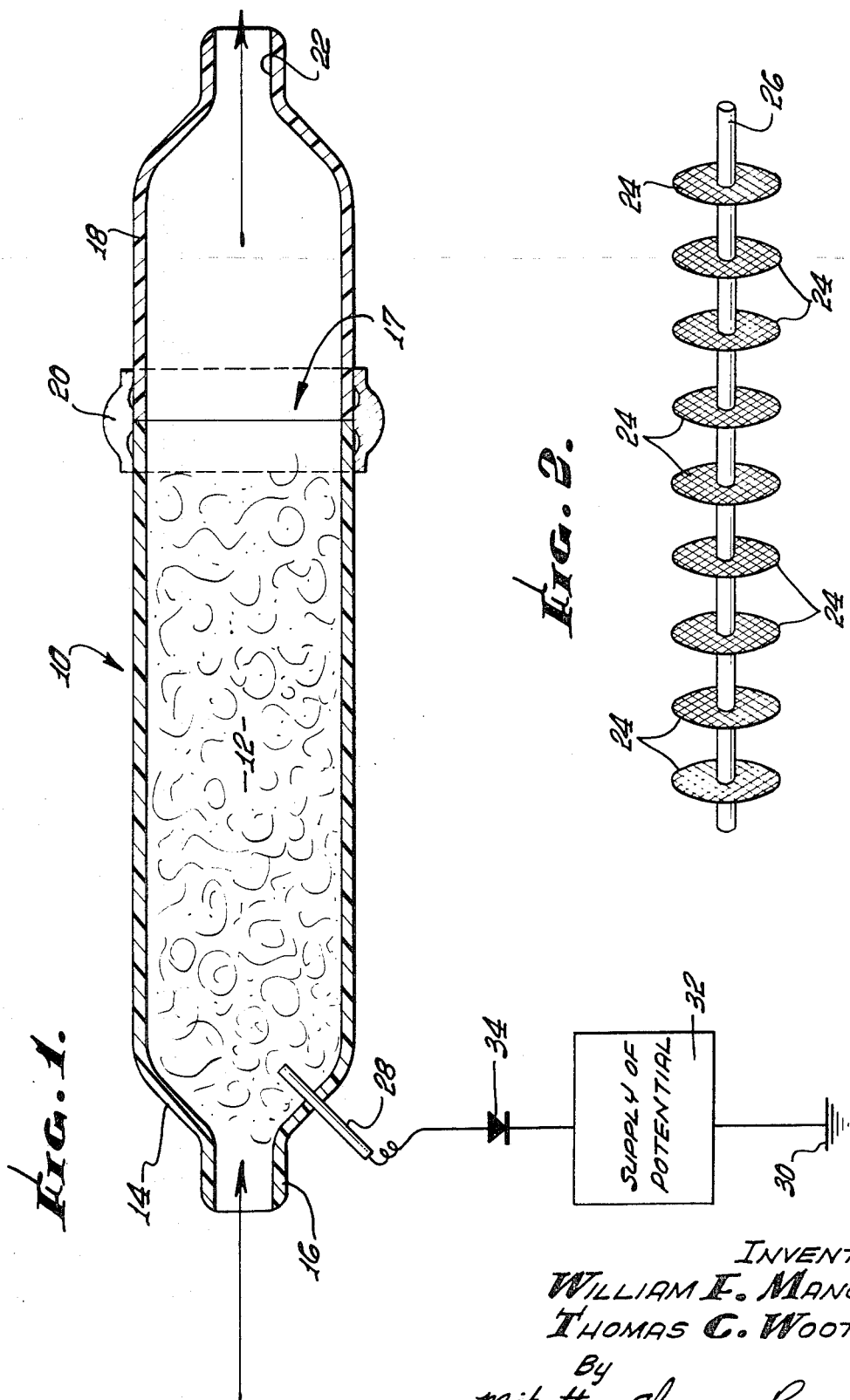

ABSTRACT OF THE DISCLOSURE

A method of treating gases containing noxious oxides, particularly oxides of nitrogen, without subjecting said gases to catalytic action, wherein the gases are intimately contacted with a porous body composed of fibers plated with gold, the porous body being negatively charged.

---

A great many gases, particularly gases from combustion, contain objectionable oxides of nitrogen and sulfur (such as $NO_2$, $N_2O_4$ and $SO_2$). Probably the most objectionable gases containing the aforesaid noxious oxides are those gases which are produced from internal combustion engine exhausts (this term including diesel, Otto cycle and jet engines). It has been determined that these gases are one of the prime sources of smog.

As is well-known, the problem of smog contamination has greatly increased and, as civilization becomes more civilized and sophisticated and as the population expands, it is predicted that air pollution will become even a greater problem in the future. The United States Federal Government as well as some states have taken certain action to eliminate this air pollution problem by placing restrictions on industrial companies emitting combustion gases as well as requiring motor vehicles to have so-called smog control devices. However, at the present time, there are no smog control devices available to the general public which remove oxides of nitrogen and sulfur from gases produced by internal combustion engines. These oxides, when present in the atmosphere, are one of the prime sources of the eye smarting which people find so objectionable and it is hypothesized that there is a possibility that said oxides cause cancer of the lungs as well as having other adverse effects on the health of human beings.

It has therefore long been a desideratum in the art to find a method which can easily and economically eliminate oxides of nitrogen and sulfur which are contained in most combustion gases and many prior art workers have attempted to solve the problem. However, so far, no practical means have been developed which can eliminate noxious oxides from combustion gases produced by internal combustion engines.

The method of this invention can be utilized wherever it is necessary to remove oxides of nitrogen and sulfur from a gas contaminated with such oxides. For example, this invention may be utilized in air conditioning, the treatment of industrial stack gases, and the purification of numerous other sources of polluted air. However, in view of the great need for an economical and simple device for ridding internal engine exhaust gases of the aforesaid noxious oxides this invention is particularly adapted for use in the treatment of such exhaust gases. It is noted that when the device and method of this invention are used in removing noxious oxides from gases produced by internal combustion engines it is unnecessary to employ afterburners, and/or expensive catalysts. Moreover, and most importantly, the device can be utilized for long periods of time without having to replace it or clean it.

Accordingly, among the objects of the present invention is the provision of a simple, effective, and inexpensive one step method of treating and rendering gases containing oxides of nitrogen and sulfur innocuous.

Another object of our invention is to disclose and provide a simple and inexpensive device adapted for use in connection with internal combustion engines for the removal of oxides of nitrogen and sulfur from the exhaust gases produced by such engines.

Another and further object of the invention is to embody and provide a device which removes a substantial amount of oxides of nitrogen and sulfur from gases for indefinite periods of time without having to be cleaned or replaced.

Generally stated, a device embodying the present invention may comprise a housing adapted to be attached to the exhaust of internal combustion engines, said housing being provided with means for emitting gases thereinto and discharging the treated gases therefrom, said housing containing a porous body composed of finely divided gold plated material, said body being electrically insulated from the housing and/or any other ground, and at an electrically negative potential. The porous body is so positioned as to be in the flow path of gases passing through the housing so that the gases come in intimate contact with the gold which is plated on the finely divided material.

It is preferred that the finely divided material is in the form of fibers which are loosely positioned in the form of a mat or sponge so that gases can easily pass therethrough but the gases come in contact with the gold which is plated on the fibers. Since the gold itself is, or can be, the electrical conductor it is of no moment what the particular composition of the fibers is. Thus, the fibers can be composed of various metals such as steel; ceramics, or even a plastic such as polytetrafluorine (sold under the trademark Teflon). It is of prime importance that as much gold as possible be available for contact with the gases.

As explained supra, the removal of oxides of nitrogen and sulfur is accomplished by causing gases containing such oxides to come in intimate contact with the gold of the porous body while the body has a negative potential, said negative potential being supplied by any known source.

We have observed, that when the porous body is composed of fibers of metal (sometimes called metal wool, the metals we have tested including steel, stainless steel, aluminum, bronze, brass and stainless steel plated with nickel), and the porous body has a negative potential of between 6000 and 50,000 volts, that the porous body will only remove a substantial portion of oxides of nitrogen and sulfur for a very short period of time, e.g. five minutes. Thereafter the reduction in oxides of nitrogen and sulfur rapidly decreased to almost zero in say about one-half hour. Needless to say, such a device could not be utilized as means for removing oxides of nitrogen and sulfur from gases because it is not practical to clean or replace the device every five minutes.

Why this occurs is not known by us but it is believed that the reason for the rapid fall-off in the reduction of the amount of oxides of nitrogen and sulfur is because, for one reason or another, the porous body no longer is able to supply a negative charge to the gases being passed therethrough.

Surprisingly and unexpectedly when any of the metals hereinbefore mentioned are plated with gold and there is applied thereto a negative potential of between 6000 and 50,000 volts there was a greater removal of oxides of nitrogen initially (approximately 90% removal) than when unplated metals were utilized (between 65% and 70% removal) but more importantly our tests show that even after 40 hours of running time there is still an 85% to 90% reduction in the oxides of nitrogen. Again, why the gold plated fibers have such an effect on the removal of oxides of nitrogen is not known but, at the present time, we believe that the gold unexpectedly aids in transmitting the negative electrical charge to gases and thereby alters the various noxious oxides to harmless material as $N_2$. In any event, for whatever reason it is clear that the fibers plated with gold give vastly superior results as compared with fibers which are unplated. The difference in results is the difference between success and failure.

DESCRIPTION OF THE PREFERRED EMBODIMENTS

Generally stated, a device embodying the present invention may comprise a housing provided with means for admitting gases thereinto and discharging treated gases therefrom, said housing containing a gas-permeable body of finely divided material which is plated with gold and which is so positioned in the housing that said body is in the flow path of gases passing through the housing. The porous body is connected to a source of negative electrical potential of between about 6000 and 50,000 volts, said body being electrically insulated from its surroundings as, for example, by making the housing of a dielectric material. For the purpose of simplifying description, reference will be had to the appended drawing of exemplary forms particularly adapted for use with exhaust gases of internal combustion engines, it being understood that the selection of the exemplars is not a limitation.

FIG. 1 is a longitudinal section of the preferred exemplary form of device.

FIG. 2 is a perspective view of an alternative exemplary embodiment of the porous body.

The gases from internal combustion engines and other industrial sources are generally at super-atmospheric temperatures and therefore the housing 10 is preferably made of a heat resistant material which, in addition, is also a dielectric in order to insulate the porous body 12 from its surroundings. Examples of such materials which may be mentioned are alumina ($Al_2O_3$) and various ceramic materials.

The housing 10 may be cylindrical and provided with an end wall 14 at one end, said end wall including an axial inlet opening and means such as sleeve 16 for connecting the housing to a source of gases to be treated.

The opposite end of the housing 10 is preferably open, as indicated generally at 17, where a removable cover 18 is attached by suitable connecting means such as clamp 20. The cover 18 has an axial port 22 through which the treated gases may be discharged.

The porous body 12 in the preferred exemplary embodiment is gold plated fibers which are loosely positioned in the form of a mat or sponge so that the gases can easily pass therethrough but the gases come in contact with gold which is plated on the fibers. The porous body 12 is maintained in the housing 10 by friction and is slidable into the housing when the cover 18 is removed.

In the alternative exemplary form the gold plated fibrous mat is replaced in the housing 10 with a series of circular porous mesh discs 24 formed of fibers plated with gold which are held in an upright position by connecting means 26 such as a rod 26 made of an electrically conducting material, e.g. steel. The circular discs are slidable into housing 10 when cover 22 is removed and are held in housing 10 by friction fit.

In the drawing, the housing 10 is shown provided with a metallic probe 28 which is of such length and at such an angle that, when the receptacle is loaded with a porous body the probe will extend into firm contact therewith so that the entire porous body is supplied with an electrical potential. For example, the probe 28 could contact any of the discs 24 and thereby charge all of the discs due to the fact that connecting means 26 is electrically conductive.

The probe 28 is supplied with a source of negative potential, preferably at a relatively high voltage; a negative potential difference of about 6000 and 50,000 volts between probe 28 and ground 30 has been successfully employed to produce an electric field within the porous body. As exemplary of a source of negative potential, it is noted that the output of power supply 32 may lead through a diode 34 from a high voltage transformer.

Because most automobiles are now supplied with alternators this is preferably utilized to provide the source of potential. Since the alternator supplies alternating current the diode 34 is necessary in order to supply a negative potential to the porous body 12. Of course, if a battery or other source of direct current is utilized the diode may be dispensed with.

The current requirements are small, the current actually supplied to the probe in the metallic wal being normally on the order of 20 to 50 milliamps.

As previously indicated, the products of combustion are positively charged in passing through the electrically insulated porous body 12 which is being supplied with negative potential. Normally, oxides of nitrogen and sulfur are formed in an exhaust muffler or discharged into the atmosphere for further oxidation, whereas in our device the negatively charged porous body removes from 70 to 90 percent of the oxides of nitrogen and sulfur from such exhaust gases.

Precisely how the oxides of nitrogen and sulfur are removed is not known for certain but it is believed that said oxides are transformed into, e.g. molecular nitrogen and oxygen, because of the negative potential which supplies electrons. In any event, the fact remains that oxides of nitrogen which are virtually non-removable by prior methods are not present in the gases discharged from the device coming within this invention and employing the methods herein disclosed.

It will be readily apparent that in the event a device of the character described hereinbefore is installed so as to receive exhaust gases from an automobile engine on a vehicle, the porous body can be very easily and rapidly cleaned or replaced at intervals. It is only necessary for the service station attendant to remove the cover 18, pull out the porous body and rinse it off with water or gasoline in order to remove all adhering carbons and components attracted and held by the porous body. Since the fibers forming the porous body are plated with gold almost any solvent can be utilized because gold is largely unaffected by ordinary solvents. The cleansed porous body can be replaced and the cover applied whereupon the device is ready to function for another prolonged period of time.

It should be noted that is essential that the porous body be insulated from its surroundings. In the preferred exemplary embodiment such electrical insulation is accomplished by making the housing 10 of a dielectric material. However, if it is desired because of economics or for some other reason to make the housing 10 of metal then it is possible to place the porous body in a foraminous receptacle which can be spaced from the housing 10 by dielectric buttons. In such event, probe 28 should be electrically insulated from housing 10.

The foregoing description of the preferred exemplary embodiments of this invention are solely for the purpose of illustration and are not considered to be limiting; all changes and modifications coming within the scope of the appended claims are embraced thereby.

We claim:

1. A method of eliminating oxides of nitrogen contained in combustion gases without subjecting the gas to initial polarization or a catalyst, which comprises:

passing said gases containing oxides of nitrogen through a porous body of finely divided gold plated material, a substantial portion of the gases coming into intimate contact with said gold, said porous body being electrically insulated from its surroundings, applying a negative potential of between 6000 and 50,000 volts to said body relative to ground, thereby causing an electrical charge to be applied to the oxides of nitrogen, and maintaining said electrical charge for a sufficient length of time to substantially reduce the amount of oxides of nitrogen in said gases and thereafter removing said gas from said body.

2. A method according to claim 1 wherein the finely divided material is in the form of a mesh composed of fibers plated with gold.

3. A method according to claim 2 wherein the fibers are metallic wool plated with gold.

4. A method according to claim 1 wherein the porous body is a series of discs formed of fibers plated with gold, said discs being connected electrically with each other.

References Cited

UNITED STATES PATENTS

| | | | |
|---|---|---|---|
| 1,298,889 | 4/1919 | Chance | 204—312 |
| 2,579,441 | 12/1951 | Palmer | 55—131 |
| 2,605,170 | 7/1952 | Fugassi | 23—220 |
| 2,673,141 | 3/1954 | Barman | 23—220 |
| 2,701,621 | 2/1955 | Srague | 55—131 |
| 2,822,058 | 2/1958 | Roos et al. | 55—131 |
| 2,910,343 | 10/1959 | Childers et al. | 23—220 |
| 3,125,408 | 3/1964 | Childers et al. | 23—220 |
| 3,459,494 | 8/1969 | Harris et al. | 23—220 |

FOREIGN PATENTS

| | | | |
|---|---|---|---|
| 1,071,059 | 12/1959 | Germany | 204—312 |

ROBERT K. MIHALEK, Primary Examiner

U.S. Cl. X.R.

23—220; 55—131; 204—177, 312; 252—474